Aug. 17, 1948.　　　　E. F. SHELL　　　　2,447,035
TIRE REPAIR APPARATUS
Filed Dec. 10, 1945　　　　2 Sheets-Sheet 1
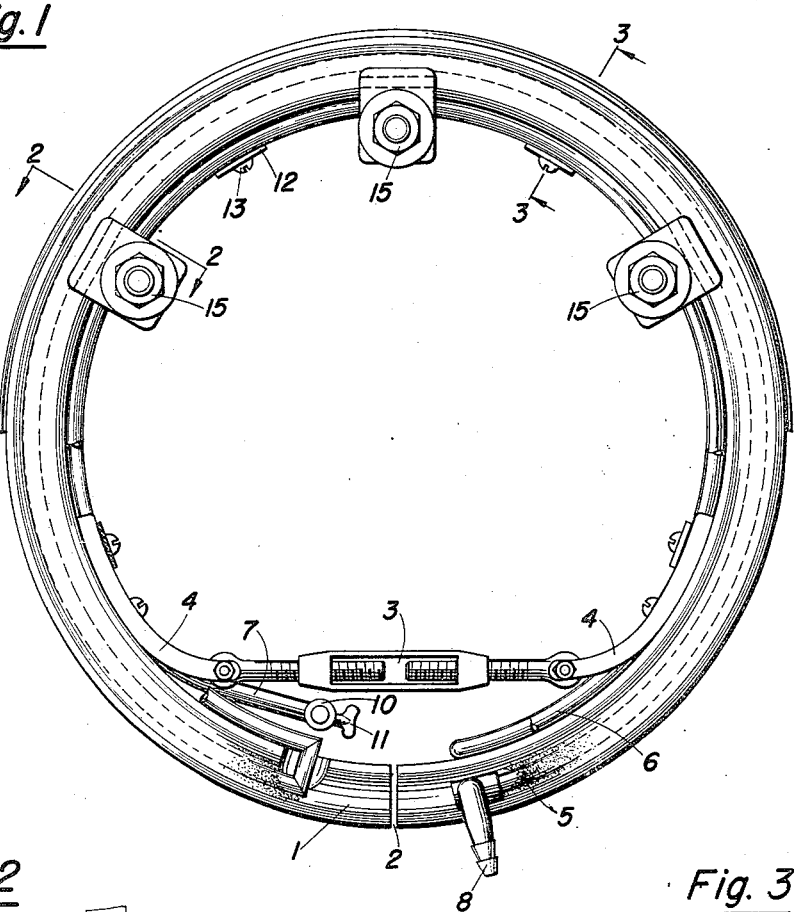
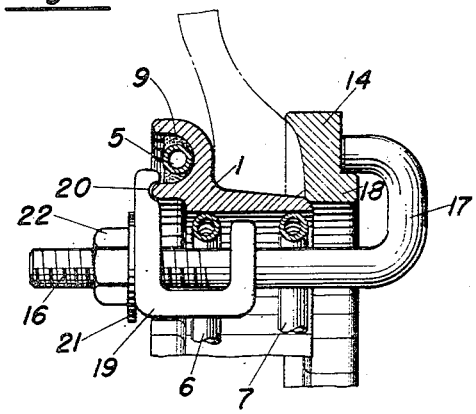
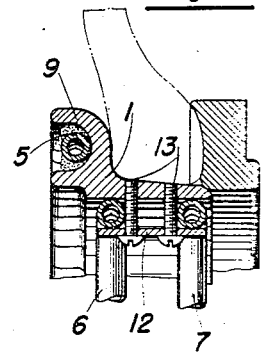
INVENTOR
ELWOOD F. SHELL
BY
ATTORNEY

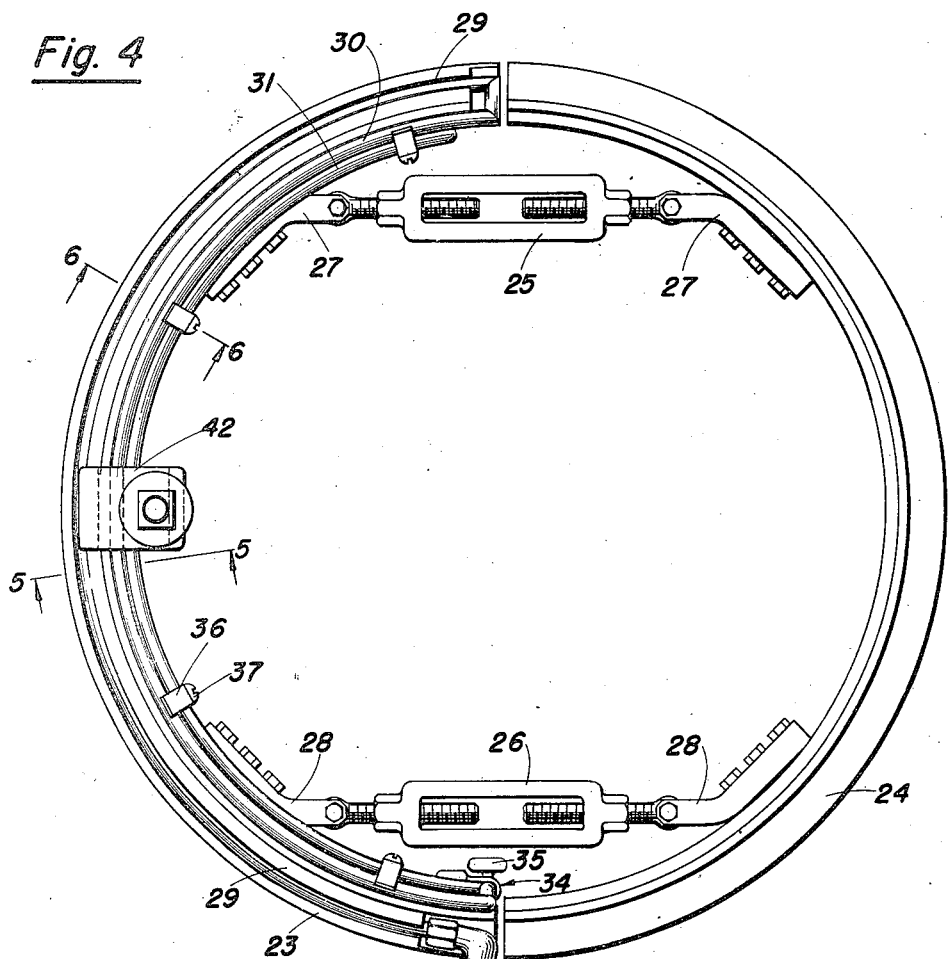
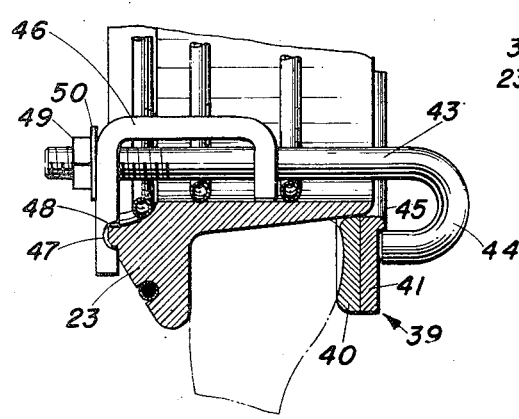
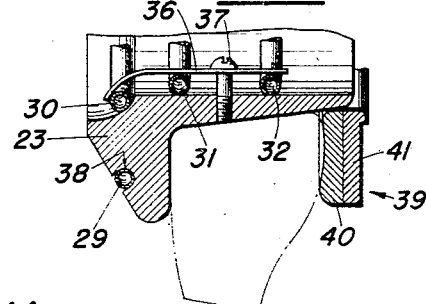

Patented Aug. 17, 1948

2,447,035

UNITED STATES PATENT OFFICE 2,447,035

TIRE REPAIR APPARATUS

Elwood F. Shell, San Francisco, Calif.

Application December 10, 1945, Serial No. 634,136

6 Claims. (Cl. 18—18)

(Granted under the act of March 3, 1883, as amended April 30, 1928; 370 O. G. 757)

This invention relates to tire repair apparatus, and more particularly to apparatus for vulcanizing new material in place about a damaged bead on a resilient tire.

It is an object of this invention to provide improved apparatus which is useful in repairing tire beads.

A further object is to provide apparatus which may be used to repair a tire bead by vulcanizing new material into place along damaged portions of the bead.

Still another object is to provide apparatus of the character described above, which is adjustable for use in the repair of beads on tires of varying size.

In accomplishing these and other objects of the present invention, I have provided improved details of structure, preferred forms of which are illustrated in the accompanying drawings, wherein:

Fig. 1 is a plan view of a tire repair apparatus embodying the features of the present invention;

Fig. 2 is a view in cross section of the apparatus taken along the line 2—2 in Fig. 1;

Fig. 3 is a view in cross section of the apparatus taken along the line 3—3 in Fig. 1;

Fig. 4 is a plan view of a modified form of apparatus embodying the features of the present invention;

Fig. 5 is a view in cross section of the apparatus taken along the line 5—5 in Fig. 4; and Fig. 6 is a view in cross section of the apparatus taken along the line 6—6 in Fig. 4.

Referring more in detail to the drawings:

Shown at 1 is a substantially annular die, or support, having a flange as viewed in cross section, adapted to fit over adjacent outer peripheral surfaces of a tire bead under repair. (A tire bead engaged by the apparatus, and a portion of the tire, are shown in dotted outline in Figs. 2, 3, 5 and 6.) This die is split at 2 and may be expanded as desired to fit snugly against a given tire bead under repair by adjustment of a turnbuckle 3 which is fitted across the die from positions adjacent the split portion 2. The said turnbuckle is secured to the die by means of brackets 4 mounted thereon.

Mounted circumferentially about the surfaces of the die which do not engage the tire bead is a metallic steam line which is twice doubled back along its length to form a series of coils 5, 6, and 7. These coils are so mounted that no one of them crosses the split portion 2 of the die. The steam line includes a nozzle member 8 joined to one end of the line, and leading into the outermost of the coils, coil 5. The latter member is soldered into place in an annular groove 9 provided in die 1, and leads, in turn, into coil 6, while coil 6 leads into coil 7. The steam line includes an exhaust 10, having valve 11, which is mounted on the end of coil 7. Coils 6 and 7 are mounted against the surface of the die 1 by means of clamp plates 12 which are secured in place on the die by means of screws 13 (Fig. 3).

Shown at 14 (Fig. 2) is a lock ring which is shaped to fit snugly against the inner surface of the tire bead. This ring, which may either extend entirely about the periphery of the bead, or may comprise a shorter arcuate member, should be long enough to overlie the length of bead which is undergoing repair. It will be noted that the lock ring 14 can not be expanded as can the die 1; hence, a lock ring member of the correct predetermined shape and curvature is selected when repairing a tire of a given size. In general, I prefer that the lock ring be fabricated of aluminum, or other strong, heat conductive alloy.

The die 1 and the lock ring 14 are secured in position about the tire bead by means of clamps 15. Each clamp comprises a threaded stem member 16 having a hooked end portion 17 thereon, the latter portion fitting against the surface of lock ring 14 opposed to that in contact with the tire bead. A flange 18 is provided on the lock ring surface to engage the hooked end portion 17 of the clamp and prevent the clamp from sliding off on tightening.

Slidably mounted on the clamp stem 16 is a jaw member 19 which is adapted to engage the outer surface of the die 1. Jaw member 19 is provided with a groove 20 which engages the lower lip of the groove 9 on the die, or support, 1 as the clamp is tightened, thereby preventing the clamp from slipping off the die. A washer 21 on stem 16, and a nut 22 in threaded engagement on said stem, complete the clamp assembly, tightening of the clamp being effected in the normal manner by tightening the nut 22.

A modified form of apparatus is illustrated in Figs. 4, 5 and 6. The annular tire engaging means which is here employed comprises a pair of semi-circular supports termed a die member 23 and a spacer member 24, which members are joined by turnbuckles 25 and 26 through brackets 27 and 28 mounted on said members. A steam line comprising semi-circular coils 29, 30, 31 and 32, together with entrance and exhaust nozzles 33 and 34, and a valve 35 in the nozzle 34, is mounted on the die 23. The coils 30, 31 and 32 are secured by means of clamp plates 36 and screws 37 to the die 23, while coil 29 is secured, as by soldering, within a groove 38 in said die.

A bi-metallic lock ring 39 having an inner portion 40 consisting of aluminum or other metal of high heat conductivity and an outer portion 41 made up of steel or other strong metal, is employed about the inner periphery of the tire bead in the same manner as was the lock ring 14 described hereinbefore.

Clamps 42, only one of which is shown in Fig. 4, secure the outer tire engaging means and the lock ring in a contacting position about the bead of the tire as particularly shown in Fig. 5. Clamp 42 is similar to the clamp 15 hereinbefore described and comprises a threaded stem member 43 having a hooked end portion 44, the latter fitting against the surface of the portion 41 of the lock ring 39 and engaging a flange 45 on said ring. The clamp has a slidably mounted jaw member 46 provided with a groove 47 which engages an annular lip 48 on the die 23. A nut 49 and a washer 50 on the stem portion 43 complete the clamp assembly.

This modified form of apparatus is particularly well adapted to the repair of tires of a relatively large size since tires of this character seldom require repair to more than half the periphery of a given bead. However, it is obvious that two steam-coil bearing dies, as 23, could well be joined together were it desired that heat be supplied about the entire periphery of a given bead.

*Operation*

The manner of operation of the apparatus described herein may be described as follows:

The damaged tire bead is first prepared for treatment in the normal manner, damaged material being cut away wherever necessary, new cushion gum being cemented into place, and any torn fabric being properly stitched down. The die 1 (or the companion die and spacer 23 and 24) is then positioned about the tire bead and firm engagement between the die and the bead is effected by adjustment of the turnbuckle. The lock ring is then fitted within the tire against the inner surface of the bead, and the ring is drawn up against the adjacent end of the die, as illustrated in Figs. 2 and 5, by means of the clamps. Steam is then introduced through the steam line in sufficient amount to maintain the apparatus, and the tire bead, at the desired vulcanizing temperature. A temperature of about 285° F., plus or minus 10° F., maintained for a period of about one hour, normally suffices for the vulcanizing and repair of most tire beads.

It should be pointed out that a particular advantage of using the apparatus described herein is the production of a repaired tire bead having a perfectly round periphery without in any way reducing the internal diameter of the tire.

While I have shown but certain embodiments of my invention, it is susceptible to further modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In an apparatus of the character described, tire engaging means shaped to fit against outer surfaces of a tire bead and expansible in a direction to vary the effective circumference thereof to accommodate beads on tires of various sizes; expansion means associated with said expansible tire engaging means for adjustably conforming the same to urge the same into circumferential engagement with said outer surfaces of said tire bead; a second tire engaging means shaped to fit against inner surfaces of said tire bead; heating means associated with said first-mentioned tire engaging means and adapted to heat the same; and means for engaging both said tire engaging means and maintaining the same in position about a tire bead.

2. In an apparatus of the character described, tire engaging means having a generally circular configuration and shaped to fit against the outer peripheral portions of a tire bead, said means being expansible in a direction to vary the effective circumference thereof to accommodate beads on tires of various sizes; expansion means associated with said expansible tire engaging means for adjustably conforming the same to urge the same into close circumferential engagement with said tire bead; heating means associated with said tire engaging means and adapted to heat the same; a second tire engaging means shaped to fit against inner peripheral portions of said tire bead; and clamp means for engaging both said tire engaging means and maintaining them in a contacting position about said tire bead.

3. In an apparatus of the character described, a split annular support having a surface shaped to fit against a tire bead; heating means mounted on said support; adjustment means mounted on said support adjacent the split portion thereof and arranged to expand the periphery of said support; a lock ring shaped to fit against a portion of said tire bead which is not contacted by said support; and clamp means for maintaining said support and said ring in position against said tire bead.

4. In an apparatus of the character described, a split annular support having a concave outer surface shaped to fit against a tire bead; steam coil means mounted on surfaces of said support not adapted to contact said tire bead; a turnbuckle mounted on said support across the split portion thereof and arranged to expand the periphery of said support; a lock ring shaped to fit against a portion of said tire bead which is not contacted by said support; and clamp means for engaging said support and said ring and for maintaining them in position against said tire bead.

5. In an apparatus of the character described, an annular support comprising a pair of semicircular members having outer surfaces shaped to fit against a tire bead, adjustable connecting means mounted between opposing interior surfaces of said pair of members and arranged to expand said support by forcing said members away from one another, and heating means mounted on the surface of at least one of said pair of members; a lock ring shaped to fit against a portion of said tire bead which is not contacted by said pair of members; and clamp means for engaging said support and said ring and maintaining them in position against said tire bead.

6. In an apparatus of the character described, an annular support comprising a pair of semicircular members having outer surfaces shaped to fit against a tire bead, a pair of turnbuckles connecting said pair of members, each turnbuckle being mounted between opposing interior surfaces of said members adjacent the ends thereof, and a steam coil means mounted on surfaces of said pair of members not adapted to contact said tire bead; a lock ring shaped to fit against a portion of said tire bead which is not contacted by said pair of members; and clamp means for engaging said support and said ring and maintaining them in position against said tire bead.

ELWOOD F. SHELL.

REFERENCES CITED

The following references are of record in the file of this patent:

UNITED STATES PATENTS

| Number | Name | Date |
|---|---|---|
| 1,837,356 | Cartier | Dec. 22, 1931 |
| 2,059,851 | Corbin, Jr. | Nov. 3, 1936 |
| 2,158,703 | Kite | May 16, 1939 |

FOREIGN PATENTS

| Number | Country | Date |
|---|---|---|
| 175,309 | Great Britain | Feb. 10, 1922 |
| 532,712 | France | Nov. 19, 1921 |